United States Patent Office 3,328,345
Patented June 27, 1967

---

3,328,345
METHYLVINYLORGANOSILICON POLYMERS
Christian R. Sporck, Burnt Hills, N.Y., assignor to General Electric Company, a corporation of New York
No Drawing. Filed Dec. 18, 1961, Ser. No. 160,269
2 Claims. (Cl. 260—46.5)

The invention relates to certain cyclic organopolysiloxanes and to polymers prepared therefrom.

A number of cyclic organosilicon materials and polymers prepared therefrom are known in the art, including materials which contain a high proportion of silicon-bonded phenyl groups. However, one of the known disadvantages of materials containing a high proportion of phenyl groups is the fact that these materials are usually hard, intractable materials which are difficult to shape. In addition, it is often found that linear polydiorganosiloxanes containing a high percentage of silicon-bonded phenyl groups are difficult to cure by ordinary free radical catalysts. The presence of a large proportion of silicon-bonded phenyl groups in organosilicon polymers is desirable because of the properties imparted to these polymers by the phenyl groups. Phenyl groups attached to silicon improve the resistance of organosilicon materials to irradiation such as pile irradiation or high energy electron irradiation. In addition, the presence of silicon-bonded phenyl groups renders elastic organopolysiloxanes stable at a temperature far above the temperature at which methylpolysiloxane elastomers are stable.

It is an object of the present invention to provide a new class of cyclic organosilicon compounds and to provide high molecular weight linear organosilicon compounds from these cyclic organosilicon compounds, the high molecular weight linear organosilicon compounds having a high percentage of silicon-bonded phenyl groups but being readily curable to the solid, elastic state by conventional silicone rubber curing catalysts.

The cyclic organosilicon compounds of the present invention have the formula:

(1) 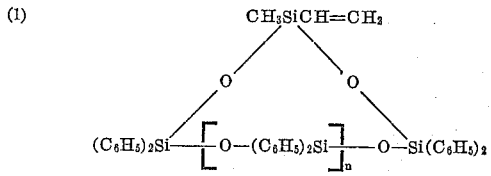

where $n$ is a whole number equal to from 0 to 1, inclusive. The cyclopolysiloxane of Formula 1 can be polymerized to provide linear organopolysiloxanes consisting essentially of the recurring unit:

(2) $-(C_6H_5)_2Si[O-(C_6H_5)_2Si]_nO-$
$Si(C_6H_5)_2-O-(CH_3)(CH_2=CH)Si-O-$ where $n$ is as previously defined. In addition, the cyclopolysiloxanes of Formula 1 can be copolymerized with other cyclopolysiloxanes to form a number of copolymers.

As is apparent from Formula 1, two cyclopolysiloxanes are encompassed within the scope of the present invention. These materials are 1-methyl-1-vinyl-3,3,5,5-tetraphenyl-cyclotrisiloxane and 1-methyl-1-vinyl-3,3,5,5,7,7-hexaphenylcyclotetrasiloxane.

The cyclopolysiloxanes within the scope of Formula 1 are prepared by effecting reaction between an hydroxy chain-stopped polydiphenylsiloxane having the formula:

(3) 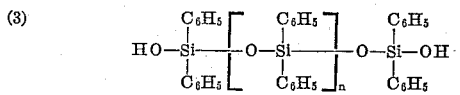

where $n$ is as previously defined, and a methylvinyldihalogenosilane having the formula:

(4) $(CH_3)(CH_2=CH)SiX_2$ where X is halogen, e.g., chlorine, bromine, etc. and preferably chlorine. It is apparent that Formula 3 encompasses two compounds, namely, tetraphenyldisiloxanediol-1,3 and hexaphenyltrisiloxanediol-1,5.

The reaction to form the cyclopolysiloxane of Formula 1 theoretically involves one mole of the hydroxyl chain-stopped material of Formula 1 and one mole of the dihalogenosilane of Formula 4 and results in the formation o ftwo moles of hydrogen halide. To facilitate the reaction, a hydrogen halide acceptor is employed. Suitable hydrogen halide acceptors include any organic tertiary amine such as pyridine, triethyl amine, N,N-dimethyl analine, etc. In theory, one mole of the hydrogen halide acceptor is required for each mole of hydrogen halide generated. While the theoretical ratio of the reactants have been described above, the ratio of these ingredients can vary within wide limits, for example, the hydroxyl chain-stopped polydiphenylsiloxane of Formula 3 can be employed in an amount equal to from about 0.5 to 2 moles per mole of the dihalogenosilane of Formula 4. Preferably, the hydrogen halide acceptor is employed in excess with there being from about 3 to 30 moles of hydrogen halide acceptor per mole of whichever of the other two reactants is present in the smaller amount. Preferably, the hydroxyl chain-stopped material of Formula 3 and the dihalogenosilane of Formula 4 are employed in equimolar amounts to reduce the formation of by-products and to simplify the purification of the desired cyclopolysiloxane since no significant amount of unreacted starting materials are left in the reaction mixture.

Because the hydroxyl chain-stopped diphenylpolysiloxane of Formula 3 and the cyclopolysiloxane of Formula 1 are solid materials at room temperature, it is preferable to effect the reaction of the present invention in a solvent which is inert to the reactants under the conditions of the reaction and which is a solvent for all reactants and reaction products, except the hydrogen halide acceptor. Suitable solvents include tetrahydrofuran, tetrahydropyran, n-hexane, xylene, diethyl ether, and toluene. In general, the solvent is employed in a ratio of from about 1 to 50 parts by weight, based on the total weight of the other components of the reaction mixture.

Because the reaction to form the cyclopolysiloxane of Formula 1 proceeds at a satisfactory rate at room temperature, it is preferred to conduct the reaction at such temperature, i.e., a temperature of from about 15 to 25° C. However, it should be understood that the use of elevated temperatures, e.g., temperatures of from about 25 to 120° C. is not precluded. Depending upon the proportions of ingredients and the reaction temperature and the particular solvent employed, the time required for effecting reaction between the hydroxyl chain-stopped diphenylpolysiloxane of Formula 3 and the dihalogenosilane of Formula 4 can vary from about 1 hour to 24 hours or more. After the reaction is completed, the reaction mixture consists of a solution of the desired cyclopolysiloxane of Formula 1 together with any unreacted starting materials and a precipitate of hydrohalide of the hydrogen halide acceptor. This precipitate is filtered from the reaction mixture and the resulting filtrate is stripped of solvent and volatile starting materials, resulting in a crude product. This crude product is recrystallized from a suitable solvent such as benzene, cyclohexane ethanol or hexane or mixtures thereof to produce the purified cyclopolysiloxanes within the scope of Formula 1.

Polymeric materials consisting essentially of the recurring unit of Formula 2 can be formed by the polymerization of the cyclopolysiloxanes of Formula 1 by several methods. For example, the cyclopolysiloxanes within the scope of Formula 1 can be polymerized by heat alone, by maintaining the cyclopolysiloxane at a temperature of about 250 to 350° C., preferably in an inert atmosphere such as a nitrogen or noble gas atmosphere for about 15 minutes to one hour during which time the siloxane bonds of the cyclopolysiloxane open up and permit a conventional rearrangement and condensation to form a high molecular weight polymeric material which is a tough, transparent gum soluble in benzene and toluene. This gum can contain from about 20 to 10,000 or more, and preferably, from about 200 to 10,000 or more, of the units of Formula 2, depending upon the reaction temperature and time. In general, these gums have an intrinisic viscosity of the order of from about 0.25 to 4.0 and have a molecular weight of the order of from about 10,000 to 5,000,000 or more.

Another method of forming the polymers of the present invention is by the catalytic rearrangement and condensation of the cyclopolysiloxanes of Formula 1. This rearrangement and condensation is effected in the presence of a typical alkaline organopolysiloxane rearrangement and condensation catalyst such as potassium hydroxide.

The rearrangement and condensation catalyst is conventionally added to the cyclopolysiloxane as a solution in octamethylcyclotetrasiloxane, for example, as an octamethylcyclotetrasiloxane solution containing from about 0.1 to 1 percent potassium hydroxide. In general, the amount of potassium hydroxide added is sufficient to provide about 10 to 100 parts by weight potassium hydroxide per million parts by weight of the cyclopolysiloxane. The catalytic polymerization is effected by heating the mixture of potassium hydroxide and the cyclopolysiloxane at a temperature above the melting point of the cyclopolysiloxane so as to insure thorough mixing of the catalyst with the cyclopolysiloxane. In general, this polymerization is effected at a temperature of from about 75 to 125° C., with polymerization being effected in a time of from a few seconds up to one hour or more. The gums resulting from this base catalyzed polymerization are identical to those produced by the thermal polymerization previously mentioned.

In addition to forming polymers of the cyclopolysiloxanes of Formula 1, copolymers can be prepared by employing the cyclopolysiloxane of Formula 1 with other polydiorganosiloxane cyclic materials, preferably employing the base catalyzed reaction described above. Suitable cyclopolysiloxanes for copolymerization with the cyclopolysiloxanes of Formula 1 include, for example, hexaphenylcyclotrisiloxane, octaphenylcyclotetrasiloxane, hexamethylcyclotrisiloxane, or octamethylcyclotetrasiloxane; 1,1-dimethyl-3,3,5,5-tetraphenylcyclotrisiloxane which is described and claimed in my copending application Ser. No. 160,264, now abandoned; 1,1-dimethyl-3,3,5,5,7,7-hexaphenylcyclotetrasiloxane which is described and claimed in the copending application of Howard A. Vaughn, Jr., Ser. No. 160,267, now abandoned; triphenylsiloxy pentaphenylcyclotrisiloxane or triphenylsiloxy heptaphenylcyclotetrasiloxane which are described and claimed in my copending application Ser. No. 160,263; vinylpentaphenylcyclotrisiloxane or vinylheptaphenylcyclotetrasiloxane which are described and claimed in my copending application Ser. No. 160,268; 1,1-bis-(p-chlorophenyl)-3,3,5,5-tetraphenylcyclotrisiloxane or p-chlorophenylheptaphenylcyclotetrasiloxane which are described and claimed in my copending application, Ser. No. 160,265; methylpentaphenylcyclotrisiloxane or methylheptaphenylcyclotetrasiloxane which are described and claimed in my copending application Ser. No. 160,270; 1-methyl-1-(beta-cyanoethyl) - 3,3,5,5 - tetraphenylcyclotrisiloxane or gamma-cyanopropylheptaphenylcyclotetrasiloxane which are described and claimed in my copending application Ser. No. 160,271; compounds such as 1,1-bis-(trifluoromethylphenyl)-3,3,5,5-tetraphenylcyclotrisiloxane which are described and claimed in my copending application Ser. No. 160,272; and cyclic materials containing both siloxane linkages and silphenylene linkages such as are described and claimed in my copending application Ser. No. 160,262.

All of the aforementioned copending applications are filed concurrently herewith and assigned to the same assignee as the present invention.

The copolymerization of the cyclopolysiloxanes of Formula 1 with the aforementioned other cyclopolysiloxanes result in high molecular weight polysiloxane gums which are tough and soluble in solvents such as benzene and toluene. When copolymeric organopolysiloxanes are prepared by copolymerizing the cyclopolysiloxane of Formula 1 with another cyclopolysiloxane, the procedure employed is identical to that employed in preparing the polymers from the materials of Formula 1 alone. While the ratio of the various cyclopolysiloxanes used in the preparation of the linear copolymers can vary without limit, depending upon the characteristics desired in the final copolymeric material, it is preferred to employ about 5 to 95 percent by weight, based on the weight of the mixture of siloxanes, of the cyclopolysiloxanes of Formula 1.

All of the polymers consisting of the repeating units of Formula 2 as well as all of the copolymers which contain the repeating unit of Formula 2 together with other polyldiorganosiloxane units and which contain at least one vinyl group per one hundred silicon atoms or at least one adjacent pair of methyl group-containing silicon atoms per one hundred silicon atoms can be cross-linked with conventional free radial catalysts in the presence or the absence of various filler materials to produce cured silicone rubber. Among the many catalysts which can be employed in the cross-linking of the polymers and copolymers of the present invention are the conventional organoperoxide vulcanizing agents such as, for example, benzoyl peroxide, dichlorobenzoyl peroxide, dicumyl peroxide, tertiary butyl perbenzoate, etc., as well as the known diazo compound free radical catalysts. In addition, the polymers and copolymers of the present invention can be cross-linked by bombardment with high energy electrons by the method described and claimed in Patent 2,763,609—Lawton et al., employing an irradiation dose of from about $100 \times 10^6$ to $1000 \times 10^6$ Roentgens.

Among the fillers which can be empolyed with the polymers and copolymers of the present invention are the various silica fillers such as silica aerogel, fumed silica and precipitated silica as well as other types of fillers such as titanium dioxide, calcium silicate, ferric oxide, chromic oxide, cadmium sulfide, asbestos glass fibers, calcium carbonate, carbon black, lithopone, talc. etc. Preferably, the filler employed in preparing the silicone rubber is a finely divided silica filler. In preparing the silicone rubber from the polymers and copolymers of the present invention, the various fillers can be employed in the ratio of from about 20 to 300 parts by weight, per 100 parts by weight of the polymer or copolymer and the organoperoxide vulcanizing agent is generally employed in the ratio of from about 1 to 10 percent by weight, based on the weight of the polymer or copolymer.

Cross-linking of the catalyzed compositions is effected by heating the compositions at an elevated temperature, e.g., a temperature of from about 120 to 150° C. for a time sufficient to effect cure. In general, a satisfactory method of curing these materials comprises heating the materials in a mold at a temperature of about 125° C. for 10 minutes, followed by a post-cure at 150° C. for 16 hours.

The silicone rubbers described above are useful in all of those applications where conventional silicone rubber is useful and are particularly useful in applications where resistance to irradiation is required and where an exceptionally high degree of thermal stability is required. For example, these materials are satisfactory for use as gaskets for automotive transmissions and as oven door seals and the like.

The following examples are illustrative of the practice of my invention and are not intended for purposes of limitation. All parts are by weight.

Example 1

To a solution of 7.1 parts of methylvinyldichlorosilane and 50 parts pyridine in 210 parts diethyl ether was added a solution of 20.7 parts of tetraphenyldisiloxanediol-1,3 in 70 parts diethyl ether. The reaction mixture was stirred and allowed to stand for 16 hours, during which time pyridine hydrochloride precipitated. The pyridine hydrochloride precipitate was removed by filtration and the diethyl ether and unreacted methylvinyldichlorosilane were removed by evaporation. The resulting solids wer dissolved in hot toluene, a small amount of insoluble material was filtered from the solution and the toluene solvent was stripped from the filtrate. The resulting solids were then twice recrystallized from a mixture of four parts by volume ethanol and one part by volume cyclohexane to yield a pure white crystalline material which consisted of 1-methyl - 1 - vinyl-3,3,5,5-tetraphenylcyclotrisiloxane having the formula:

(5) 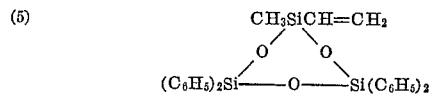

This material had a melting point of 71 to 72° C. Its identity was confirmed by infrared analysis which showed a doublet at 8.9 microns and a peak at 13.9 microns corresponding to the diphenylsiloxy units, a peak at 9.8 microns corresponding to the cyclotrisiloxane ring, a peak at 7.9 microns corresponding to methylsilyl group, and peaks at 7.1 and 10.3 microns corresponding to the vinylsilyl group. Chemical analysis showed the presence of 5.3% vinyl groups, 67.5% C, 6.1% H and 16.9% Si; as compared with the theoretical values of 5.6% vinyl groups, 67.2% C, 5.4% H and 17.4% silicon.

Example 2

A solution of 17.6 parts of methylvinyldichlorosilane in 130 parts diethyl ether and a solution of 76.5 parts hexaphenyltrisiloxanediol-1,5 in 130 parts diethyl ether were added slowly to 40 parts pyridine in 200 parts diethyl ether. After stirring for one hour, the reaction mixture was allowed to stand for 16 hours during which time pyridine hydrochloride precipitated. The precipitate was removed by filtration and the ether solvent, unreacted pyridine, and any unreacted methylvinyldichlorosilane were stripped from the reaction mixture, yielding a solid. This solid material was dissolved in hot toluene and a minor precipitate which formed was filtered off. Toluene was then removed from the filtrate by evaporation yielding a crude product. This product was purified by repeated recrystallization from a mixture of equal parts by volume of ethanol and cyclohexane. The final product was 1-methyl-1-vinyl - 3,3,5,5,7,7 - hexaphenylcyclotetrasiloxane having the formula:

(6) 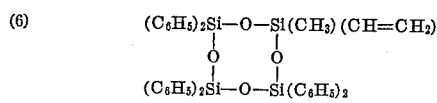

This material was a white crystalline powder having a melting point of 95 to 96° C. Infrared analysis showed a peak at 9.3 microns corresponding to the cyclotetrasiloxane ring, a peak at 7.9 microns corresponding to the methyl silyl group, peaks at 7.1 and 10.3 microns corresponding to the vinyl silyl group, and a doublet at 8.9 microns and a peak at 13.9 microns corresponding to the diphenyl siloxy groups. Chemical analyses showed the presence of 68.4% C, 5.3% H and 16.6% Si; compared to the theoretical values of 68.8% C, 5.3% H and 16.5% Si.

Example 3

A polymer was prepared by heating 7.5 parts of the 1 - methyl - 1 - vinyl - 3,3,5,5 - tetraphenylcyclotrisiloxane of Example 1 at a temperature of 108° C. to melt the crystalline material. About 0.1 part of a 0.4 percent potassium hydroxide solution in octamethylcyclotetrasiloxane was added and the mixture was stirred rapidly. Polymerization began within about 30 seconds and the mixture was allowed to stand at 108° C. for an additional 15 minutes, resulting in a polymeric material consisting essentially of the following recurring structural units:

(7) 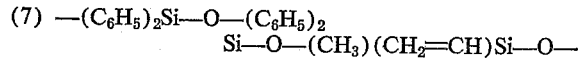

This material had an intrinsic viscosity of about 0.32 deciliters per gram when measured in toluene at 30° C. and a molecular weight of about 32,000, indicating that the average molecule contained about 66 units of Formula 7. Infrared analysis of this linear polymer confirmed that the cyclotrisiloxane structure was no longer present, while the diphenylsiloxane units and the silicon-bonded methyl and silicon-bonded vinyl groups were still present. A silicon rubber is prepared from this polymer by mixing 100 parts of the polymer with 40 parts silica aerogel and 4 parts benzoyl peroxide and heating the polymer in a closed mold for 10 minutes at 125° C. with a post-cure for 24 hours at 150° C. The resulting cured silicone rubber is a strong, elastic material having a high degree of thermal stability and resistance to the effects of ionizing radiation.

Example 4

Following the procedure of Example 3, a polymer consisting essentially of the following recurring structural units:

(8) 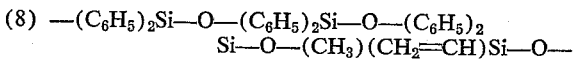

was prepared from the 1-methyl-1-vinyl-3,3,5,5,7,7-hexaphenylcyclotetrasiloxane of Example 2. This polymer was a tough gum having an intrinsic viscosity of 0.60 as measured in toluene at 30° C. This polymer had a molecular weight of about 110,000 which corresponds to about 160 of the units of Formula 8 per molecule. This polymer is converted to a silicone rubber by the procedure of Example 3.

Example 5

A copolymer was prepared by mixing 37 parts of the 1 - methyl - 1 - vinyl - 3,3,5,5 - hexaphenylcyclotrisiloxane of Example 1 with 37 parts of 1,1-dimethyl-3,3,5,5-tetraphenylcyclotrisiloxane and heating the mixture at a temperature of 108° C. while subjecting the mixture to reduced pressure to remove any entrained air or moisture. To the molten mixture was then added 1.0 part of a 0.4% potassium hydroxide solution is octamethylcyclotetrasiloxane and the catalyzed solution was maintained at 108° C. for 15 minutes. A polymer formed from the reactants within about 40 seconds. Infrared analysis of the resulting polymer which was a hard, firm gum, indicated that the gum contained both the structural units of Formula 7 as well as structural units derived from the 1,1 - dimethyl - 3,3,5,5 - tetraphenylcyclotrisiloxane. This homopolymer is converted to a silicone rubber by mixing the copolymer with a silica filler and benzoyl peroxide following the procedure of Example 3, including the cure of the catalyzed filled mixture.

Example 6

A copolymer was prepared by mixing 99.6 parts of 1,1 - dimethyl - 3,3,5,5 - tetraphenylcyclotrisiloxane with 0.4 part of the 1-methyl-1-vinyl-3,3,5,5-tetramethylcyclotrisiloxane of Formula 1 and heating the mixture to 108° C. reduced pressure to remove entrained moisture and air. One part of a 0.4% potassium hydroxide solution in octamethylcyclotetrasiloxane was mixed wtih the molten cyclic materials and after 15 minutes a firm elastic gum soluble in toluene and xylene was formed. Infrared analysis of this copolymer indicated that the polymer was free of cyclopolysiloxanes. This copolymer is converted to a silicone rubber by mixing one part of the copolymer with 0.1 part of precipitated silica and 0.016 part of tertiary butylperbenzoate and heating the resulting mixture at a temperature of 120° C. for 10 minutes with a postcure at 150° C. for 24 hours to yield a tough silicone rubber.

What I claim as new and desire to secure by Letters Patent of the United States is:

1. The chemical compound 1-methyl-1-vinyl-3,3,5,5,7,7-hexaphenylcyclotetrasiloxane.

2. A linear organopolysiloxane having a molecular weight of at least about 10,000 and consisting essentially of a plurality of recurring structural units having the formula:

$$-(C_6H_5)_2Si-O-(C_6H_5)_2Si-O-(C_6H_5)_2Si-O-(CH_3)(CH_2=CH)Si-O-$$

References Cited

UNITED STATES PATENTS

| 2,645,628 | 7/1953 | Hurd | 260—448.2 |
| 2,684,379 | 7/1954 | Guillissen et al. | 260—448.2 |
| 2,868,766 | 1/1959 | Johannson | 260—448.2 |
| 3,037,962 | 6/1962 | Hartung et al. | 260—448.2 |
| 3,105,061 | 9/1963 | Bruner | 260—448.2 |
| 3,122,579 | 2/1964 | Leitheiser | 260—448.2 |

FOREIGN PATENTS 1,161,802  3/1958  France.

TOBIAS E. LEVOW, *Primary Examiner.*

SAMUEL H. BLECH, *Examiner.*

R. D. FREEDMAN, J. G. LEVITT, P. F. SHAVER, *Assistant Examiners.*